(12) United States Patent
Won et al.

(10) Patent No.: US 8,160,023 B2
(45) Date of Patent: Apr. 17, 2012

(54) APPARATUS AND METHOD FOR SUPPORTING HANDOVER IN BROADBAND WIRELESS COMMUNICATION SYSTEM

(75) Inventors: Jeong-Jae Won, Hwaseong-si (KR); Hyon-Goo Kang, Suwon-si (KR); Young-Seok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 965 days.

(21) Appl. No.: 12/147,439

(22) Filed: Jun. 26, 2008

(65) Prior Publication Data

US 2009/0005046 A1 Jan. 1, 2009

(30) Foreign Application Priority Data

Jun. 29, 2007 (KR) .................. 10-2007-0065572

(51) Int. Cl.
*H04B 7/216* (2006.01)
*H04L 12/56* (2006.01)
(52) U.S. Cl. ......... 370/331; 370/329; 370/278; 370/252
(58) Field of Classification Search .................. 370/329, 370/331, 278, 252
See application file for complete search history.

(56) References Cited

U.S. PATENT DOCUMENTS

| 8,036,176 B2 * | 10/2011 | Oba et al. ...................... 370/331 |
| 2007/0265008 A1 * | 11/2007 | Feder et al. ................... 455/436 |
| 2011/0083168 A1 * | 4/2011 | Dutta et al. ....................... 726/4 |

FOREIGN PATENT DOCUMENTS

| KR | 10-2006-0052472 A | 5/2006 |
| KR | 10-2006-0092787 A | 8/2006 |
| KR | 10-2006-0093020 A | 8/2006 |
| KR | 10-2006-0103105 A | 9/2006 |

* cited by examiner

*Primary Examiner* — John Pezzlo
(74) *Attorney, Agent, or Firm* — Jefferson IP Law, LLP

(57) ABSTRACT

An apparatus and method for supporting a handover from a macro Base Station (BS) to a micro BS in a broadband wireless communication system are provided. The apparatus includes a user layer for requesting scanning information on micro BSs among neighbor BSs and an MIH function for obtaining the scanning information on the micro BSs by interoperating with an MIH server according to the request and for transmitting the obtained information to the user layer. Accordingly, the handover from the macro BS to the micro BS can be achieved.

13 Claims, 5 Drawing Sheets

APPARATUS AND METHOD FOR SUPPORTING HANDOVER IN BROADBAND WIRELESS COMMUNICATION SYSTEM

PRIORITY

This application claims the benefit under 35 U.S.C. §119 (a) to a Korean patent application filed in the Korean Intellectual Property Office on Jun. 29, 2007 and assigned Serial No. 2007-65572, the entire disclosure of which is hereby incorporated by reference.

BACKGROUND OF THE INVENTION

1. Field of the Invention

The present invention relates to an apparatus and method for supporting a handover in a broadband wireless communication system. More particularly, the present invention relates to an apparatus and method for supporting a handover from a macro Base Station (BS) to a micro BS.

2. Description of the Related Art

In general, voice services have been a primary concern in the development of communication systems. As communication technologies have advanced, various multimedia and data services, in addition to the voice services, are becoming increasingly important. However, voice-based communication systems have failed to satisfy user demand for multimedia and data services due to a relatively small transmission bandwidth and expensive service fees. Moreover, growing demand for Internet services has resulted in an increased need for a communication system capable of effectively providing the Internet services. To cope with such user demand, a broadband wireless communication system has been introduced to effectively provide broadband Internet services.

In addition to voice services, a broadband wireless communication system supports various data services with a high or low speed as well as multimedia application services (e.g., high-quality video). That is, a broadband wireless communication system can access a Public Switched Telephone Network (PSTN), a Public Switched Data Network (PSDN), an Internet network, an International Mobile Telecommunication (IMT) 2000 network, and an Asynchronous Transfer Mode (ATM) network in a fixed or mobile environment based on a wireless medium using a broadband spectrum (e.g., 2 GHz, 5 GHz, 26 GHz, 60 GHz, etc.). Furthermore, a broadband wireless communication system can support a channel transmission rate of 2 Mbps or more. A wireless communication method of a broadband wireless communication system is being standardized by the Institute of Electrical and Electronics Engineers (IEEE) 802.16 group.

At present, in a broadband wireless communication system, installation of a micro Base Station (BS) is being considered. The installation of a micro base station is provided to complement a macro BS. More specifically, the micro BS is a home BS or a Small Office Home Office (SOHO) BS, which is installed in an area that is not covered by a service area of the conventional BS or in an area where service quality is unsatisfactory due to weak signal strength. Similar to the macro BS, the micro BS provides a portable Internet service to a Mobile Station (MS). The micro BS can be characterized by low output, small capacity, and low cost, which are optimized for a small indoor environment (i.e., home or SOHO). Two important aspects of the micro BS are that it must be able to interoperate with the macro BS, and a conventional MS must be able to receive a service while switching between the micro BS and the macro BS. More specifically, improved quality services must be provided without interruption to the MS by performing a handover between the macro BS and the micro BS according to a wireless environment.

In a conventional handover process, when a handover request is made to a neighbor cell or a neighbor sector according to changes in a user's communication environment, an MS measures a channel condition of neighbor BSs on the basis of downlink signals received from the neighbor BSs. For example, in a broadband wireless communication system, a serving BS receives information on the neighbor BSs from a BS management server and broadcasts a MOBile_NeighBoR_ADVertisement (MOB_NBR_ADV) message including the information about the neighbor BSs. In this case, the MS performs a series of scanning operations for measuring the channel conditions of the neighbor BSs on the basis of the MOB_NBR_ADV message.

To perform the conventional handover process using a handover between a serving macro BS and a target micro BS, specific information about the target micro BS must be included in the information transmitted by the BS management server to the serving macro BS. However, at present, the BS management server does not manage the information on the target micro BS. Thus it is not possible to transmit the information on the target micro BS through the MOB_NBR_ADV message. That is, a handover from the macro BS to the micro BS cannot be achieved using the existing IEEE 802.16e technique.

Accordingly, there is a need for a new method for supporting a handover from the macro BS to the micro BS in a broadband wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting a handover from a macro Base Station (BS) to a micro BS using an Institute of Electrical and Electronics Engineers (IEEE) 802.21 Media Independent Handover (MIH) technique in a broadband wireless communication system.

In accordance with an aspect of the present invention, an apparatus for supporting a handover of a Mobile Station (MS) in a broadband wireless communication system is provided. The apparatus includes a user layer for requesting scanning information on micro BSs among neighbor BSs, and an MIH function for obtaining the scanning information on the micro BSs and for transmitting the obtained information to the user layer.

In accordance with another aspect of the present invention, a method of supporting a handover in an MS in a broadband wireless communication system is provided. The method includes requesting scanning information on micro BSs among neighbor BSs to an MIH function and, upon receiving the scanning information on the micro BSs, requesting a scan of at least one of the micro BSs by using the received scanning information on the micro BSs.

In accordance with yet another aspect of the present invention, a method of supporting a handover by an MIH function of an MS in a broadband wireless communication system is provided. The method includes receiving a request for scanning information on micro BSs among neighbor BSs, obtaining the scanning information on the micro BSs, and transmitting the obtained information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary apparatus and method for supporting a handover of a broadband wireless communication system will hereinafter be described. The Institute of Electrical and Electronics Engineers (IEEE) 802.21 standard provides a seamless handover and service continuity between heterogeneous networks in order to improve convenience for a user of a Mobile Station (MS). As a basic requirement, a Media Independent Handover (MIH) function, an Event Service (ES), a Command Service (CS), and an Information Service (IS) are defined. The present invention to be described below relates to an apparatus and method for supporting a handover from a macro Base Station (BS) to a micro BS by using an IEEE 802.21 MIH technique.

Figure 1:
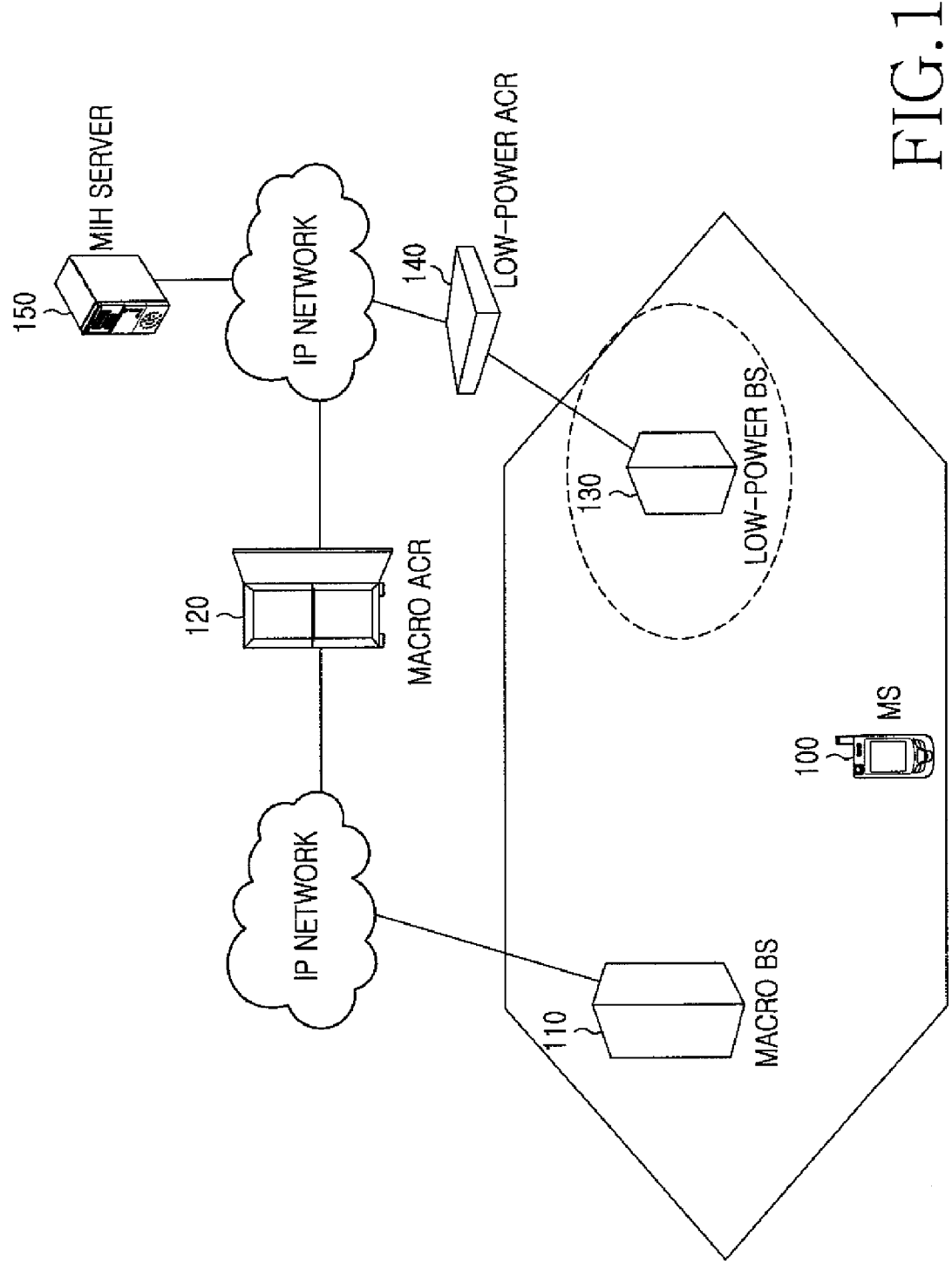
FIG. 1 illustrates a network structure of a broadband wireless communication system according to an exemplary embodiment of the present invention.

FIG. 1 illustrates a network structure of a broadband wireless communication system according to an exemplary embodiment of the present invention.

Referring to FIG. 1, the broadband wireless communication system includes an MS 100, a macro BS 110, a macro Access Control Router (ACR) 120, a micro BS 130, a micro ACR 140, and an MIH server 150.

The macro BS 110 represents a BS which covers a wide area including the coverage of one or more micro BSs 130. The macro BS 110 provides a portable Internet service to the MS 100. The macro ACR 120 manages connection and mobility of the MS 100.

The micro BS 130 provides the portable Internet service to the MS 100 when the MS enters the service area of the micro BS 130. The micro ACR 140 manages connection and mobility of the MS 100.

The MIH server 150 manages information on one or more macro BSs for each system and information on one or more micro BSs for each macro BS using a database. At the request of the MS 100, the MIH server 150 reads out the information on the one or more micro BSs 130 belonging to the coverage of the serving macro BS 110 and transmits the information to the MS 100. Herein, the information on the macro BS and the micro BS includes information required to scan corresponding BSs.

By accessing the macro BS 110, the MS 100 receives the portable Internet service. When the MS 100 enters the service coverage area of the micro BS 130, a handover may be performed from the macro BS 110 to the micro BS 130. Thereafter, the MS 100 receives the portable Internet service from the micro BS 130. According to an exemplary embodiment of the present invention, the MS 100 receives information required to scan macro BSs among neighbor BSs by using a message which is periodically broadcast by the macro BS 110. Furthermore, in an exemplary embodiment, the MS 100 receives information required to scan micro BSs among the neighbor BSs through communication with the MIH server 150 using the IEEE 802.21 MIH technique. If the received information on the neighbor BSs includes information on one or more micro BSs, the MS 100 performs a scanning process on the corresponding micro BSs. If one micro BS is determined through the scanning process, then a handover to the determined micro BS is performed. Otherwise, if the received information on the neighbor BSs does not include information on a micro BS but only includes information on macro BSs, the MS 100 performs the scanning process on the corresponding macro BSs. If a macro BS providing better reception performance is determined through the scanning process, then a handover to the determined macro BS is performed.

Figure 2:
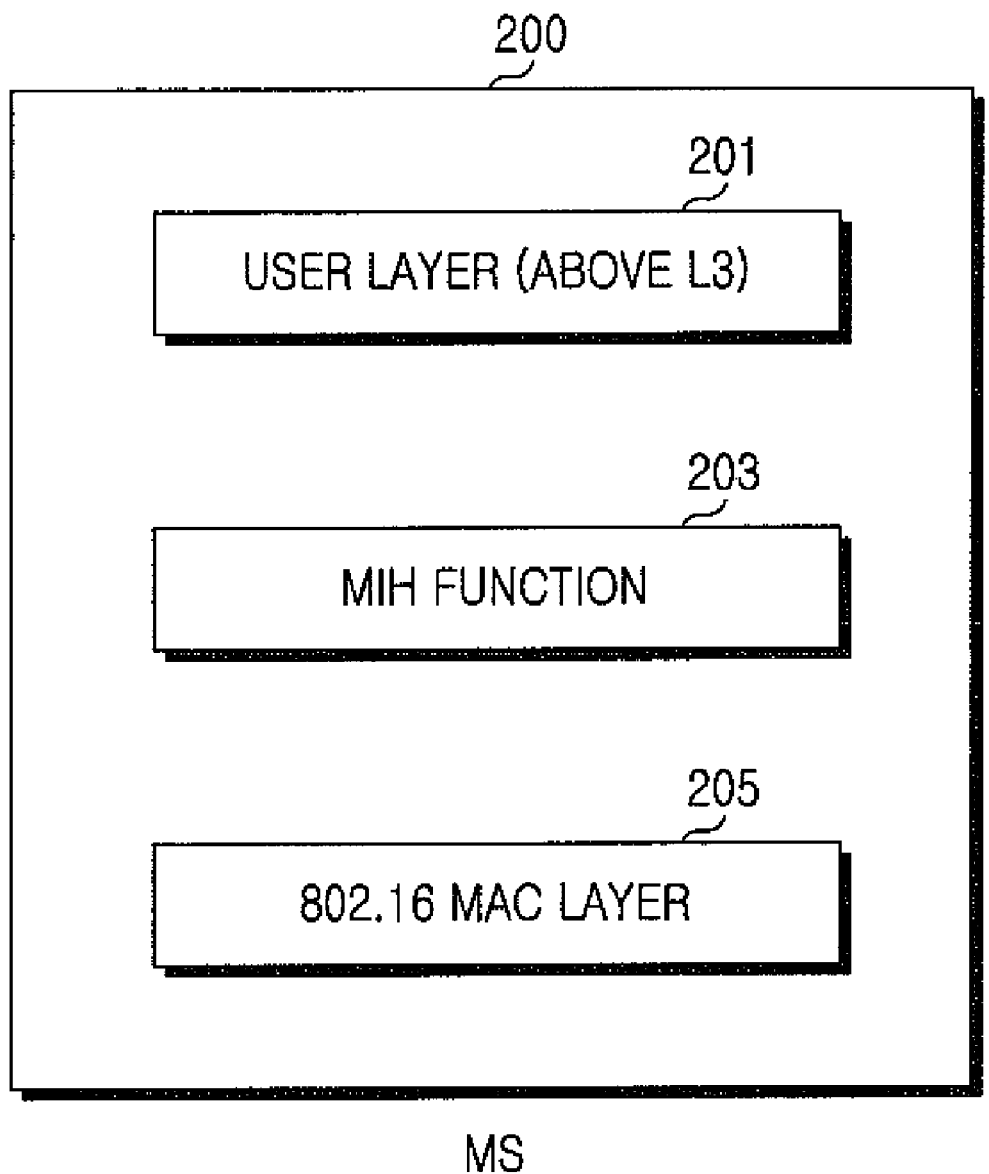
FIG. 2 illustrates a protocol configuration model of a Mobile Station (MS) supporting an Institute of Electrical and Electronics Engineers (IEEE) 802.21 Media Independent Handover (MIH) technique according to an exemplary embodiment of the present invention.

FIG. 2 illustrates a protocol configuration model of a Mobile Station (MS) supporting an Institute of Electrical and Electronics Engineers (IEEE) 802.21 Media Independent Handover (MIH) technique according to an exemplary embodiment of the present invention.

Referring to FIG. 2, a protocol configuration model of an exemplary MS 200 supporting the IEEE 802.21 MIH technique is shown. The protocol configuration model includes a user layer 201, an MIH function 203, and an 802.16 Media Access Control (MAC) layer 205. The user layer 201 represents an upper layer (e.g., an L3 layer or above). In the user layer 201, an MIH command is generated and then transmitted to the MIH function 203. Accordingly, the user layer 201 instructs the MIH function 203 to perform a handover-related event, and receives a response thereto. The MIH function 203 interoperates with the MIH server 150 to perform the MIH command of the user layer 201, and generates a handover-related command according to the MIH command received from the user layer 201. The generated command is transmitted to the 802.16 MAC layer 205. Accordingly, the MIH function 203 instructs the 802.16 MAC layer 205 to perform the handover-related event, and receives a response thereto. The 802.16 MAC layer 205 performs a scanning process and a handover process through communication with the macro BS 110 and the micro BS 130 according to the command received from the MIH function 203, and transmits a response thereto.

Figure 3:
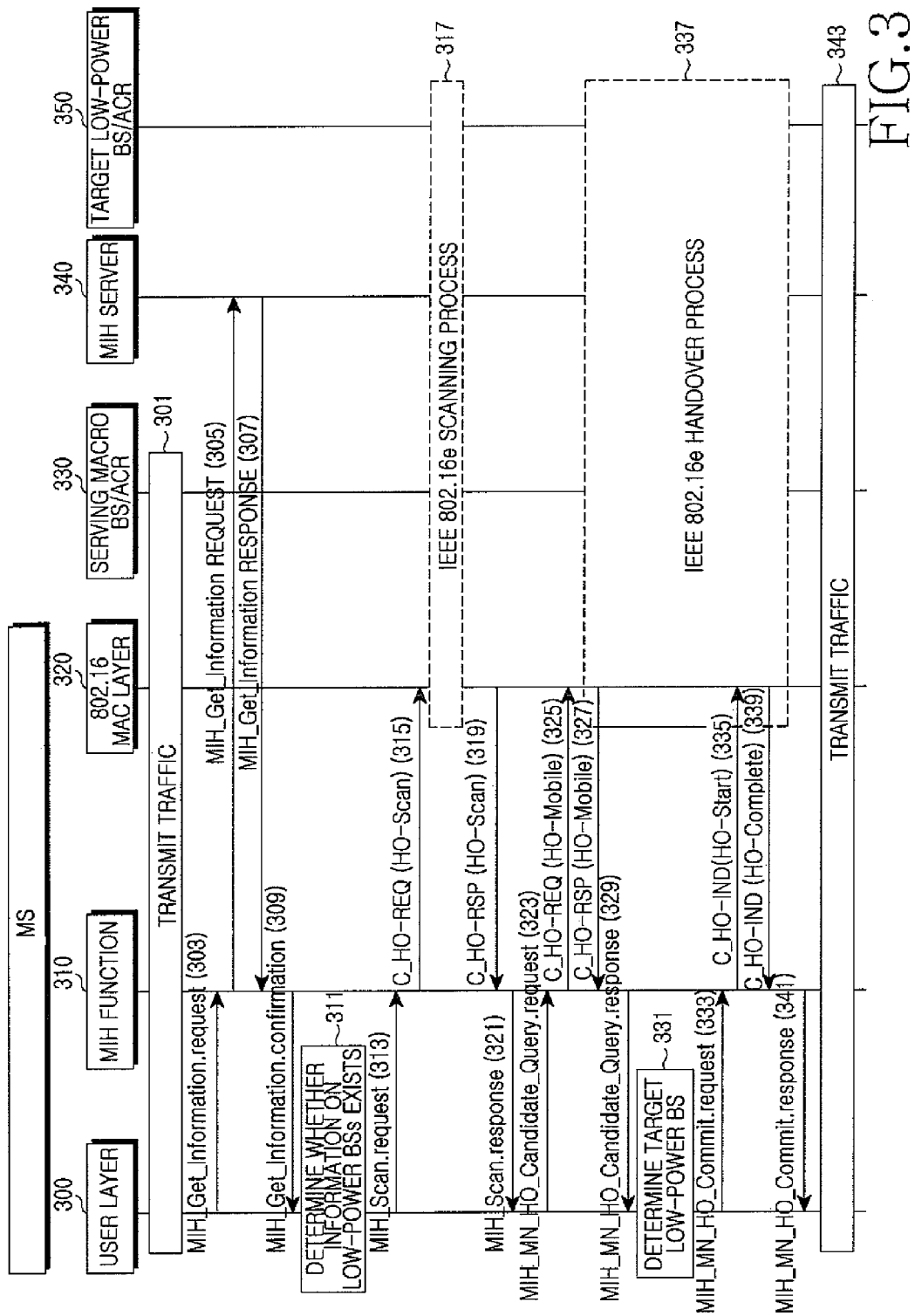
FIG. 3 is a flow diagram illustrating a handover process between a macro Base Station (BS) and a micro BS by using an MIH technique in a broadband wireless communication system according an exemplary embodiment of to the present invention.

FIG. 3 is a flow diagram illustrating a handover process between a macro BS and a micro BS in a broadband wireless communication system according to an exemplary embodiment of the present invention.

Referring to FIG. 3, in step 301, an MS receives a service by transmitting/receiving traffic to/from a serving macro BS/ACR 330 using an internal layer (i.e., a user layer 300, an MIH function 310, and an 802.16 MAC layer 320). While receiving the service from the serving macro/ACR 330, the MS receives a MOBile_NeighBoR_ADVertisement (MOB_NBR_ADV) message periodically broadcast from the serving macro BS/ACR 330 and thus receives information on neighbor BSs. That is, the MS periodically receives information required to scan the neighbor BSs. The information on the neighbor BSs is included in the MOB_NBR_ADV message. The information on the neighbor BSs only includes information on macro BSs and does not include information on micro BSs.

Therefore, in order to receive information on the micro BSs within the respective service areas of the neighbor BSs, the user layer 300 of the MS uses the IEEE 802.21 MIH technique. Specifically, in step 303, the user layer 300 transmits to the MIH function 310 an "MIH_Get_Information.request" message including identifier information of the serving macro BS. Thus the user layer 300 requests the MIH function 310 to obtain the information on the neighboring micro BSs through communication with an MIH server 340 and to provide the obtained information. Upon receiving the "MIH_Get_Information.request" message, the MIH function 310 transmits to the MIH server 340 an "MIH_Get_Information.REQUEST" message in step 305, which requests information on the neighboring micro BSs.

In this case, the MIH server 340 searches for one or more micro BSs belonging to the coverage of the serving macro BS from a database using the identifier information of the serving macro BS. In step 307, an "MIH_Get_Information RESPONSE" message including information on the found micro BSs, that is, information required to scan the micro BSs, is transmitted to the MIH function 310. In step 309, the MIH function 310 transmits to the user layer 300 an "MIH_Get_Information.confirmation" message including information on the found micro BSs.

According to the aforementioned exemplary process, the user layer 300 collects information on neighboring BSs. More specifically, the user layer 300 collects information on the neighboring macro BSs as well as information on the neighboring micro BSs belonging to the coverage of the serving macro BS. In step 311, it is determined whether the collected information on the neighboring BSs includes information on the micro BSs. If the determination result of step 311 is positive, an "MIH_Scan.request" message, including scanning information for the micro BSs, is transmitted to the MIH function 310 in step 313 so as to scan all or some of the micro BSs. In step 315, the MIH function 310 transmits a "C_HO-REQ (HO-Scan)" message to the 802.16 MAC layer 320 so as to request the 802.16 MAC layer 320 to perform an IEEE 802.16e scanning process on the micro BSs.

In step 317, the 802.16 MAC layer 320 performs the IEEE 802.16e scanning process on the micro BSs using the scanning information. That is, reception strength (e.g., Carrier to Interference and Noise Ratio (CINR)) of the micro BSs is measured. In the IEEE 802.16e scanning process, the 802.16 MAC layer 320 performs scanning on the micro BS/ACR 350 during a scanning period assigned by the serving macro BS/ACR 330 through signaling (i.e., transmission/reception of MOBile_SCaNning interval allocation REQuest (MOB_SCN-REQ) and MOBile_SCaNning interval allocation ReSPonse (MOB_SCN-RSP) messages) with respect to the serving macro BS/ACR 330. After performing the IEEE 802.16e scanning process on the micro BSs, in step 319, the 802.16 MAC layer 320 transmits a "C_HO-RSP (HO-Scan)" message including the scanning result (e.g., CINR) to the MIH function 310. In step 321, the MIH function 310 transmits to the user layer 300 an "MIH_Scan.response" message including the scanning result.

Upon receiving the "MIH_Scan.response" message, the user layer 300 determines one or more micro BSs having reception strength greater than that of the serving macro BS 330 as candidate micro BSs by using the scanning result. In step 323, the user layer 300 transmits to the MIH function 310 an "MIH_MN_HO_Candidate_Query.request" message including information on the determined one or more candidate micro BSs and thus requests the MIH function 310 to perform a handover process. In step 325, the MIH function 310 transmits to the 802.16 MAC layer 320 a "C_HO-REQ (HO-Mobile)" message including the information on the candidate micro BSs. Upon receiving the "C_HO-REQ(HO-Mobile)" message, the 802.16 MAC layer 320 performs the IEEE 802.16e handover process (i.e., step 337) on the candidate micro BSs. Specifically, the 802.16 MAC layer 320 transmits to the serving macro BS/ACR 330 a handover request message including the information on the candidate micro BSs. Upon receiving the handover request message, the serving macro BS/ACR 330 examines the possibility of a handover of the MS through communication with the candidate micro BSs. Thereafter, information on the one or more candidate target micro BSs to which the handover of the MS is possible is transmitted to the 802.16 MAC layer 320 of the MS. In step 327, the 802.16 MAC layer 320 transmits to the MIH function 310 a "C_HO-RSP (HO-Mobile)" message including the information on the candidate target micro BSs. Upon receiving the message, in step 329, the MIH function 310 transmits to the user layer 300 an "MIH_MN_HO_Candidate_Query.response" message including the information on the candidate target micro BSs.

In step 331, the user layer 300 determines a target micro BS by selecting one micro BS having the greatest signal strength from the candidate target micro BSs. In step 333, the user layer 300 transmits to the MIH function 310 an "MIH_MN_HO_Commit.request" message including information on the determined target micro BS so that a handover to the target micro BS is instructed. In step 335, the MIH function 310 transmits to the 802.16 MAC layer 320 a "C_HO-IND (HO-Start)" message including the information on the determined target micro BS. Thereafter, the 802.16 MAC layer 320 transmits to the serving macro BS/ACR 330 a handover indication message, releases a communication link with the serving macro BS/ACR 330, and then performs a network re-entry process with the target micro BS/ACR 350.

Accordingly, the 802.16 MAC layer 320 completes the handover with the micro BS/ACR 350. In step 339, the 802.16 MAC layer 320 transmits to the MIH function 310 a "C_HO-IND (HO-Complete)" message for reporting the completion of the handover. In step 341, the MIH function 310 transmits an "MIH_MN_HO_Commit.response" message to the user layer 300. In step 343, the MS transmits/receives traffic to/from the target micro BS/ACR 350 and thus receives a service.

Meanwhile, if it is determined in step 311 that the collected information on the neighboring BSs does not include information on micro BSs, the user layer 300 scans the macro BSs using information about the macro BSs included in the information on the neighbor BSs, according to a conventional handover process. If the scanning result satisfies a handover condition, that is, if there is a neighbor macro BS that would provide reception strength greater than that of the serving macro BS, the user layer 300 performs a handover to the neighbor macro BS.

Figure 4:
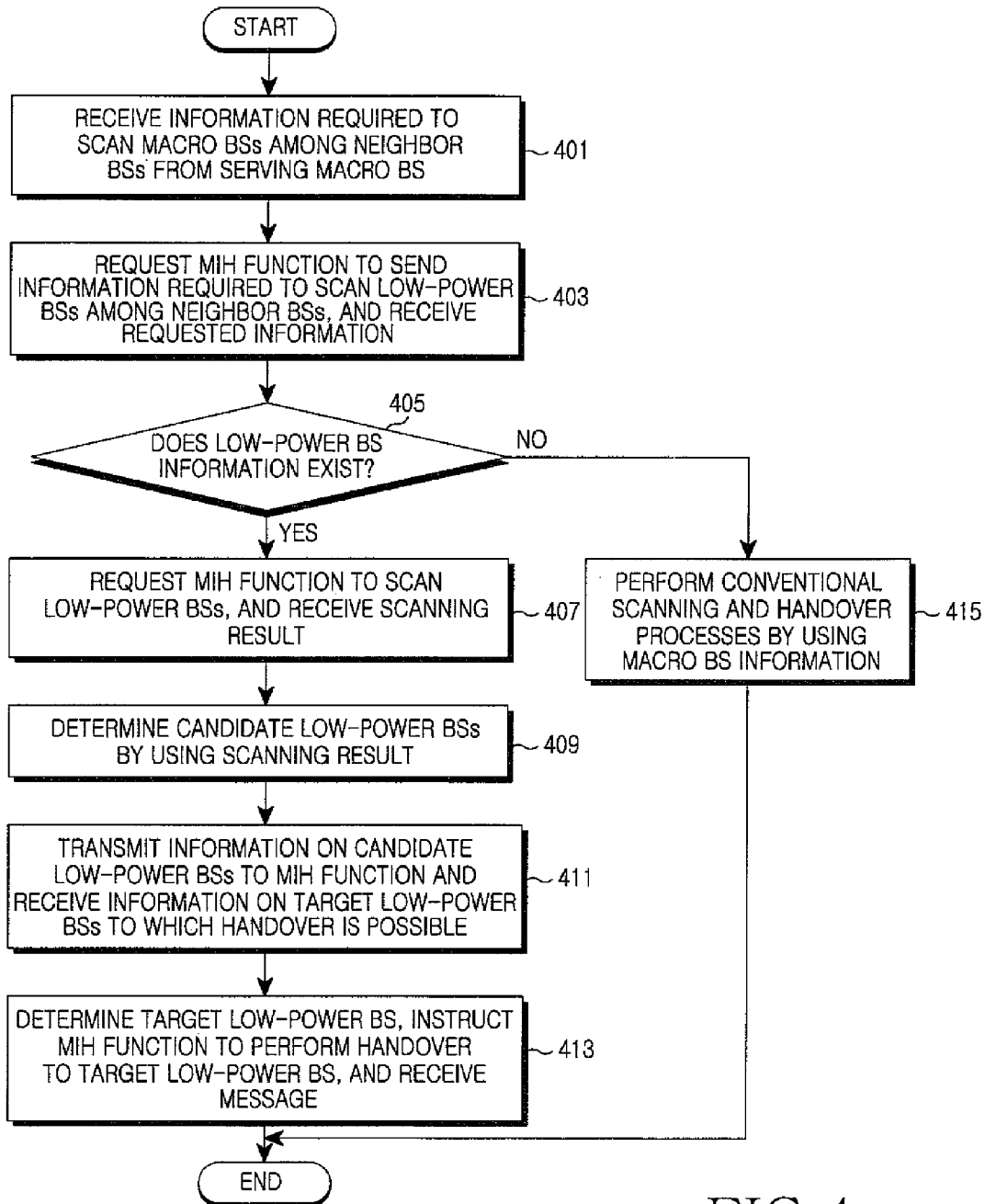
FIG. 4 is a flowchart illustrating a method of supporting a handover between a macro BS and a micro BS by a user layer of an MS in a broadband wireless communication system according to an exemplary embodiment of the present invention.

FIG. 4 is a flowchart illustrating a method of supporting a handover between a macro BS and a micro BS in a broadband wireless communication system according to an exemplary embodiment of the present invention.

Referring to FIG. 4, the MS receives information, which is required to scan macro BSs among neighbor BSs, from a serving macro BS in step 401. In an exemplary implementation, the information is received by the user layer of the MS. The information is received through a MOB_NBR_ADV message periodically broadcast from the serving macro BS.

In step 403, the MS transmits an "MIH_Get_Information.request" message including identifier information of the serving macro BS. The "MIH_Get_Information.request" message is transmitted to obtain and report information required to scan micro BSs among the neighbor BSs. Then, the MS receives an "MIH_Get_Information.confirmation" message including the required information. In an exemplary implementation, the MS includes a user layer and an MIH function. The user layer transmits to the MIH function the "MIH_Get_Information.request" message including the identifier information of the serving macro BS. Furthermore, the MIH function transmits the "MIH_Get_Information.request" message to an MIH server which reports the information required to scan any micro BSs among the neighbor BSs. The "MIH_Get_Information.confirmation" message is received by the MIH function and provided to the user layer. The following description is made of an exemplary MS including a user layer and an MIH function.

In step 405, the user layer determines whether information on micro BSs exists in the information of the neighbor BSs collected in step 401 and step 403. If information on micro BSs exists in the collected information, the user layer requests the MIH function to perform scanning by transmitting an "MIH_Scan.request" message in step 407. The "MIH_Scan.request" message includes scanning information pertaining to all or some of the micro BSs and exists in the information on the neighbor BSs. Further, the user layer receives from the MIH function an "MIH_Scan.response" message including the scanning result (e.g., CINR).

In step 409, the user layer determines one or more micro BSs, having reception strength greater than that of the serving macro BS, as a candidate micro BS by using the scanning result. In step 411, the user layer transmits to the MIH function an "MIH_MN_HO_Candidate_Query.request" message including information on the determined one or more candidate micro BSs, and receives from the MIH function an "MIH_MN_HO_Candidate_Query.response" message including information on the candidate target micro BSs to which a handover is possible.

In step 413, the user layer selects a micro BS having the greatest signal strength from among the candidate target micro BSs and determines the selected BS as a target micro BS. Further, the user layer transmits to the MIH function an "MIH_MN_HO_Commit.request" message including information on the determined target micro BS, thereby instructing a handover to the target micro BS. Thereafter, the user layer receives from the MIH function an "MIH_MN_HO_Commit.response" message and thus the completion of the handover to the target micro BS is reported.

With reference again to step 405, if the information on the micro BSs does not exist in the received information on the neighbor BSs, the user layer performs conventional scanning and handover processes using information on the macro BSs among the neighbor BSs in step 415.

Thereafter, the procedure of FIG. 4 ends.

Figure 5:
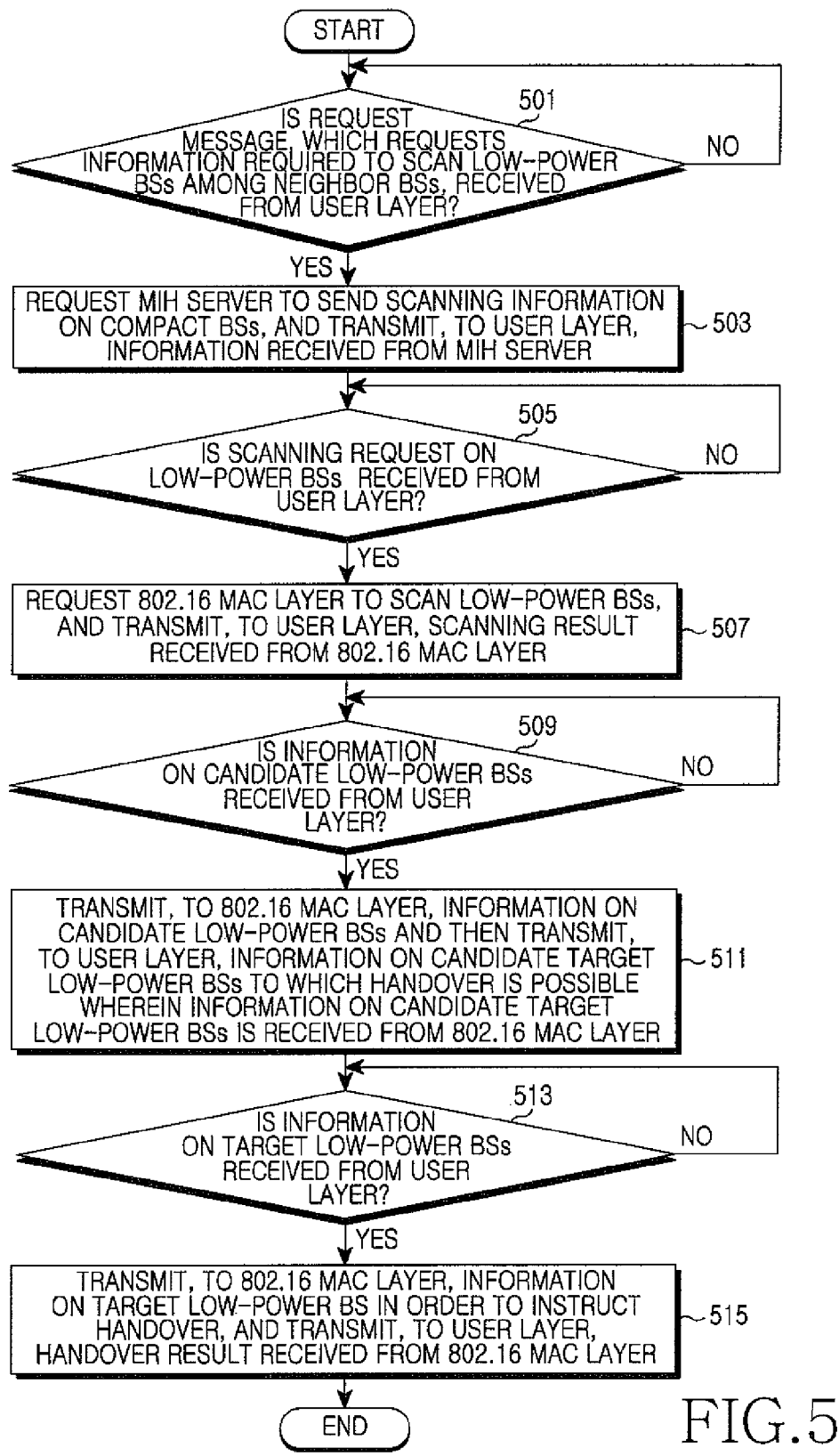
FIG. 5 is a flowchart illustrating a method of supporting a handover between a macro BS and a micro BS by using an MIH function of an MS in a broadband wireless communication system according to an exemplary embodiment of the present invention.

FIG. 5 is a flowchart illustrating a method of supporting a handover between a macro BS and a micro BS using an MIH function of an MS in a broadband wireless communication system according to an exemplary embodiment of the present invention.

Referring to FIG. 5, in step 501, the MIH function of the MS determines whether an "MIH_Get_Information.request" message, which requests information required to scan micro BSs among neighbor BSs, is received from a user layer. The "MIH_Get_Information.request" message includes identifier information of a serving macro BS.

If the message is received, in step 503, the MIH function transmits to an MIH server an "MIH_Get_Information REQUEST" message which requests the information required to scan the micro BSs among the neighbor BSs. Further, the MIH function receives from the MIH server an "MIH_Get_Information RESPONSE" message including scanning information on one or more micro BSs corresponding to an identifier of the serving macro BS. Thereafter, the MIH function transmits to the user layer an "MIH_Get_Information.confirmation" message including the scanning information on the one or more micro BSs.

In step 505, the MIH function determines whether an "MIH_Scan.request" message, which requests scanning on all or some of the micro BSs, is received from the user layer. The "MIH_Scan.request" message includes the scanning information on the all or some of the micro BSs. Upon receiving the message, in step 507, the MIH function transmits a "C_HO-REQ(HO-Scan)" message to a 802.16 MAC layer so that the 802.16 MAC layer performs an IEEE 802.16e scanning process on the corresponding micro BSs. Thereafter, the MIH function receives from the 802.16 MAC layer a "C_HO-RSP(HO-Scan)" message including a scanning result (e.g., CINR), and transmits to the user layer an "MIH_Scan.response" message including the scanning result.

In step 509, the MIH function determines whether an "MIH_MN_HO_Candidate_Query.request" message including information on one or more candidate micro BSs is received from the user layer. Upon receiving the message, the MIH function transmits to the 802.16 MAC layer a "C_HO-REQ(HO-Mobile)" message including information on the candidate micro BSs in step 511. Further, the MIH function receives from the 802.16 MAC layer a "C_HO-RSP(HO-Mobile)" message including information on one or more candidate target micro BSs to which a handover of the MS is possible. Thereafter, the MIH function transmits to the user layer an "MIH_MN_HO_Candidate_Query.response" message including the received information.

In step 513, the MIH function determines whether an "MIH_MN_HO_Commit.request" message including information on a target micro BS is received from the user layer. Upon receiving the message, in step 515, the MIH function transmits to the 802.16 MAC layer a "C_HO-IND (HO-Start)" message including the information on the target micro BS, so that a handover to the target micro BS is instructed. Further, the MIH function receives from the 802.16 MAC layer a "C_HO-IND (HO-Complete)" message which reports that the handover to the target micro BS is completed. Thereafter, the MIH function transmits to the user layer an "MIH_

MN_HO_Commit.response" message which reports that the handover to the target micro BS is completed.

Thereafter, the procedure of FIG. 5 ends.

According to exemplary embodiments of the present invention, a handover from a macro BS to a micro BS is supported by using an IEEE 802.21 MIH technique in a broadband wireless communication system. Therefore, the handover from the macro BS to the micro BS can be achieved.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the description of the invention but by the appended claims and their equivalents, and all differences within the scope will be construed as being included in the present invention.

What is claimed is:

1. An apparatus for supporting a handover of a Mobile Station (MS) in a broadband wireless communication system, the apparatus comprising:
    a user layer for requesting scanning information on micro Base Stations (BSs) among neighbor BSs; and
    a Media Independent Handover (MIH) function for obtaining the scanning information on the micro BSs and for transmitting the obtained information to the user layer,
    wherein the user layer and the MIH function are included in the MS,
    wherein the MIH function obtains the scanning information on the micro BSs by interoperating with an MIH server according to the request, and
    wherein the user layer receives the scanning information on the micro BSs from the MIH function and requests the MIH function to scan at least one of the micro BSs by using the received scanning information on the micro BSs, and wherein the MIH function requests a Media Access Control (MAC) layer to scan the at least one of the micro BSs according to the scanning request.

2. The apparatus of claim 1, wherein the MAC layer is included in the MS and scans the at least one of the micro BSs at the request of the MIH function and transmits the scanning result to the MIH function, the MIH function transmits the scanning result to the user layer, and the user layer determines candidate micro BSs by selecting at least one micro BSs having reception strength greater than that of a serving macro BS by using the scanning result and transmits scanning information on the determined candidate micro BSs to the MIH function.

3. The apparatus of claim 2, wherein the MIH function transmits to the MAC layer the scanning information on the candidate micro BSs, and, if information on candidate target micro BSs to which a handover is possible is received from the MAC layer, transmits to the user layer the received information on the candidate target micro BSs to which the handover is possible, wherein the MAC layer transmits to the serving macro BS a handover request message including scanning information, which is on the candidate micro BSs and is received from the MIH function, receives information on the candidate target micro BSs to which the handover is possible from the serving macro BS, and transmits to the MIH function the received information, and wherein the user layer determines a micro BS having greatest reception strength as a target micro BS by using the information on the candidate target micro BSs to which the handover is possible and also using a scanning result of the candidate target micro BSs.

4. The apparatus of claim 3, wherein the user layer instructs the MIH function to perform handover to the determined target micro BS, wherein the MIH function instructs the MAC layer to perform the handover to the determined target micro BS according to the instruction of the user layer, and wherein the MAC layer releases a communication link with the serving macro BS according to the instruction of the MIH function, and performs a network re-entry process with the target micro BS.

5. The apparatus of claim 1, wherein the user layer requests scanning information on the micro BSs by using an identifier of the serving macro BS, and wherein the MIH function transmits to the MIH server the identifier of the serving macro BS, receives scanning information on the micro BSs belonging to a coverage of a corresponding serving macro BS, and obtains the scanning information on the micro BSs.

6. The apparatus of claim 5, wherein the MIH server receives from the MIH function a request for the scanning information on the micro BSs, reads out the scanning information on the micro BSs mapped to the identifier of the serving macro BS, and transmits the scanning information to the MIH function.

7. The apparatus of claim 1, wherein the micro BS provides a portable Internet service to a mobile station and is optimized for a small indoor environment.

8. A method of supporting a handover in a Mobile Station (MS) in a broadband wireless communication system, the method comprising:
    requesting scanning information on micro BSs among neighbor BSs to a Media Independent Handover (MIH) function;
    upon receiving the scanning information on the micro BSs, requesting a scan of at least one of the micro BSs by using the received scanning information on the micro BSs, wherein the scanning information is received from the MIH function and the requesting of the scan comprises requesting the MIH function to perform the scan;
    upon receiving the scanning result from the MIH function, determining one or more micro BSs having reception strength greater than that of a serving macro BS using the scanning result;
    transmitting to the MIH function the scanning information on the determined candidate micro BSs;
    receiving, from the MIH function, information on candidate target micro BSs to which a handover is possible among the candidate micro BSs;
    determining a micro BS having greatest reception strength as a target micro BS by using the information on the candidate target micro BSs to which the handover is possible and also using a scanning result of the candidate target micro BSs; and
    instructing the MIH function to perform handover to the determined target micro BS.

9. The method of claim 8, wherein the micro BS provides a portable Internet service to a mobile station and is optimized for a small indoor environment.

10. A method of supporting a handover by a Media Independent Handover (MIH) function of a Mobile Station (MS) in a broadband wireless communication system, the method comprising:
    receiving a request for scanning information on micro Base Stations (BSs) among neighbor BSs, wherein when the request for the scanning information is received from a user layer, the scanning information is obtained by interoperating with a Media Independent Handover (MIH) server according to the request and the obtained information is transmitted to the user layer; and obtaining the scanning information on the micro BSs;
transmitting the obtained information;
receiving a request to perform scanning on at least one of the micro BSs from the user layer;
requesting a Media Access Control (MAC) layer to scan the at least one of the micro BSs according to the scanning request;
receiving a scanning result from the MAC layer; and
transmitting the scanning result to the user layer.

11. The method of claim 10, further comprising:
upon receiving, from the user layer, scanning information on candidate micro BSs, transmitting the received information to the MAC layer; and
upon receiving, from the MAC layer, information on candidate target micro BSs to which a handover is possible, transmitting to the user layer the received information on the candidate target micro BSs to which the handover is possible.

12. The method of claim 11, further comprising:
upon receiving from the user layer an instruction for performing a handover to a target micro BS, instructing the MAC layer to perform a handover to the determined target micro BS; and
upon receiving from the MAC layer a result obtained by performing the handover to the target micro BS, transmitting the received handover result to the user layer.

13. The method of claim 10, wherein the micro BS provides a portable Internet service to a mobile station and is optimized for a small indoor environment.

* * * * *